Figure 1:
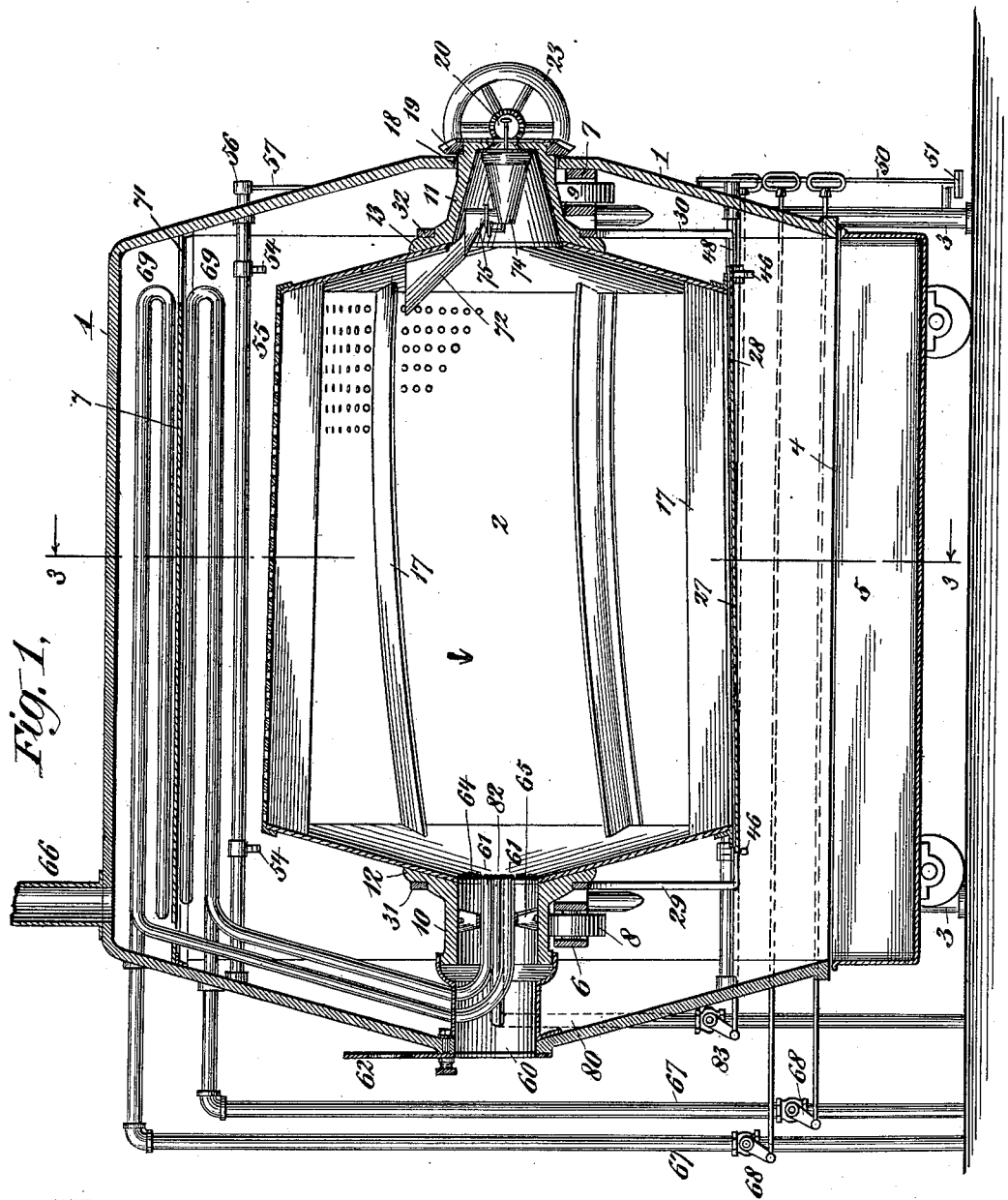

No. 642,916. Patented Feb. 6, 1900.
J. A. McCASKELL.
COFFEE ROASTING MACHINE.
(Application filed Feb. 3, 1899.)

(No Model.) 3 Sheets—Sheet 1.

WITNESSES:
D. N. Hayward
David L. Rode

INVENTOR
Jasper A. McCaskell
BY
Clarence
ATTORNEY

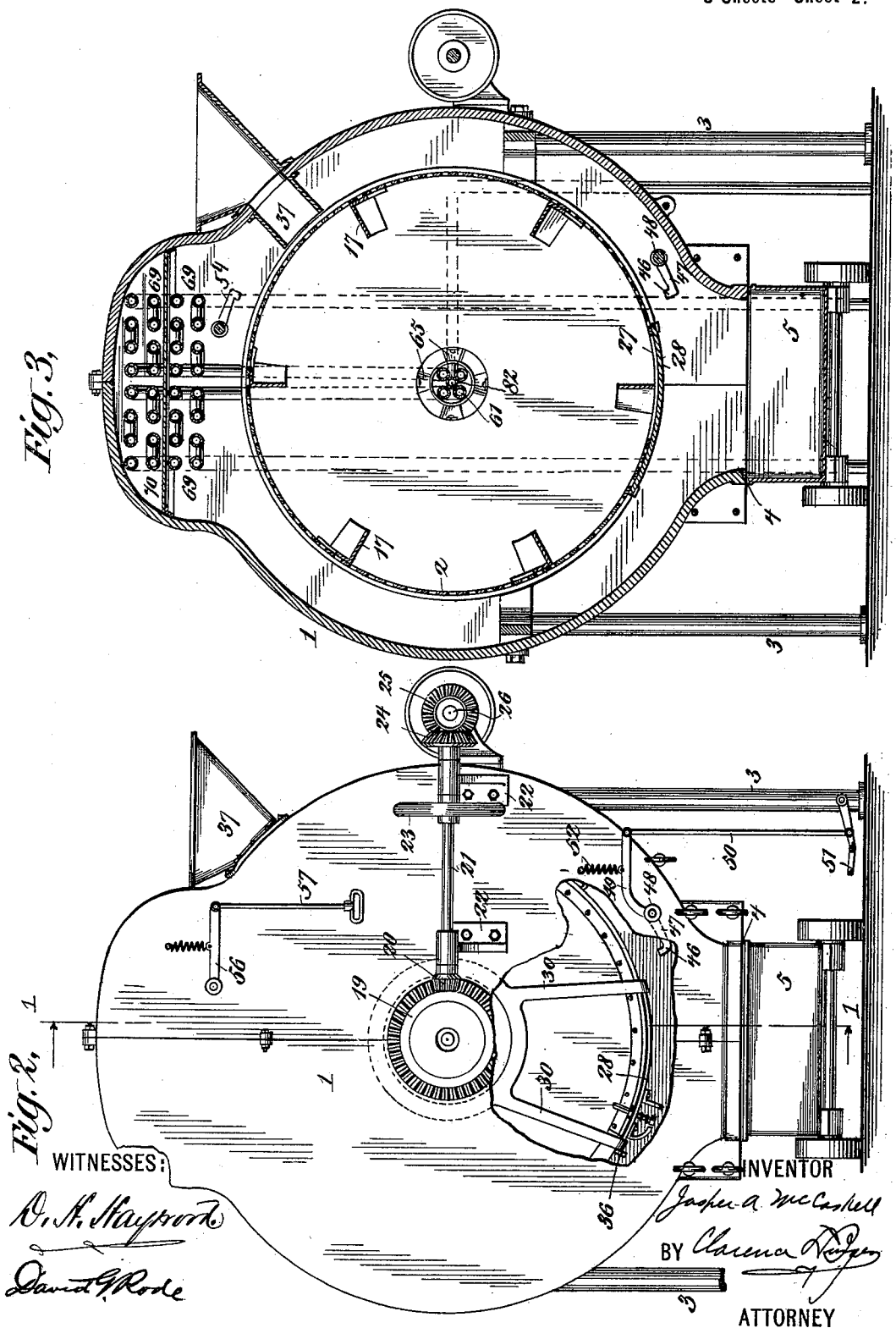

No. 642,916. Patented Feb. 6, 1900.
J. A. McCASKELL.
COFFEE ROASTING MACHINE.
(Application filed Feb. 3, 1899.)
(No Model.) 3 Sheets—Sheet 3.
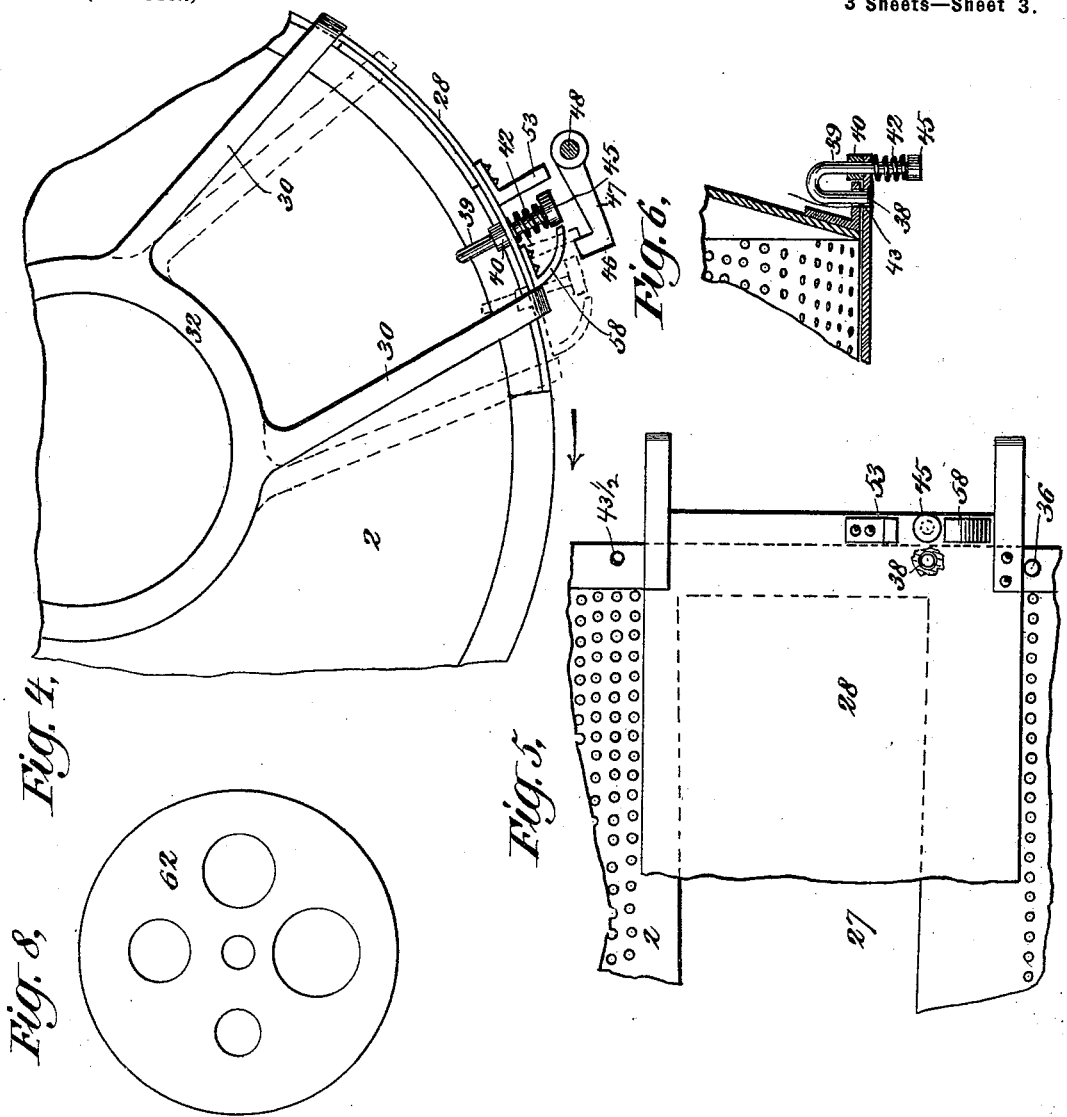
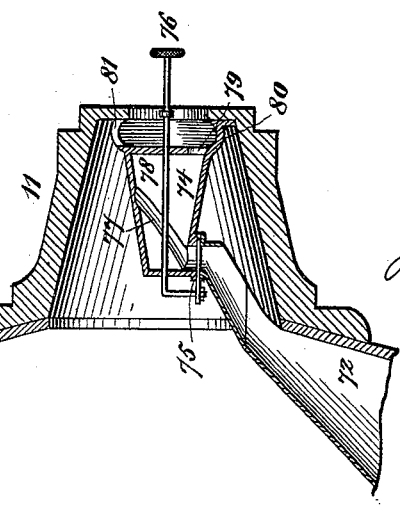
WITNESSES:
INVENTOR
Jasper A. McCaskell
BY
ATTORNEY

UNITED STATES PATENT OFFICE.

JASPER ALAN McCASKELL, OF SALT LAKE CITY, UTAH.

COFFEE-ROASTING MACHINE.

SPECIFICATION forming part of Letters Patent No. 642,916, dated February 6, 1900.

Application filed February 3, 1899. Serial No. 704,336. (No model.)

*To all whom it may concern:*

Be it known that I, JASPER ALAN MCCASKELL, a citizen of the United States, residing in Salt Lake City, county of Utah, and State of Utah, have invented a new and useful Improvement in Coffee-Roasting Machines; and I do hereby declare that the following is a full, clear, and exact description of the same.

My invention relates to machines for roasting coffee and similar substances in which heat is applied to a revolving drum containing the beans.

Among the principal objects of my invention are to provide improved means for using gas as the fuel for roasting, to effect a more thorough agitation of and a more uniform application of heat to the beans in the drum, to improve the means for introducing the coffee into the drum before roasting and for removing it after roasting, and to provide better facilities for inspecting and testing the coffee during the process of roasting, so as to determine when and how far the process is completed.

In order that my invention may be clearly understood, I shall first describe in detail the mode in which I carry the invention into practice and then point out the various features of the invention in the claims.

Reference is to be had to the accompanying drawings, forming part of this specification, in all the figures of which like parts are designated by the same numerals.

Figure 1 is a longitudinal sectional elevation of a coffee-roasting machine embodying my invention on the line 1 1, Fig. 2. Fig. 2 is an end elevation of the same. Fig. 3 is a cross-sectional elevation of the same on the line 3 3, Fig. 1. Figs. 4, 5, and 6 are enlarged detail end, side, and sectional views, respectively, showing parts of the drum and of its charging and discharging devices. Fig. 7 is an enlarged detail sectional view showing part of the drum and the testing device. Fig. 8 is an enlarged detail view of a part hereinafter described, being an apertured plate employed for regulating the supply of air to the gas-burners.

In the embodiment of my invention thus illustrated, the case 1, in which the roasting-drum 2 is inclosed, is fixedly supported on standards 3 a short distance above the floor and has a bottom opening 4 registering with a car 5, into which the coffee is discharged, as hereinafter described, after each roasting process, after which the car is withdrawn and the roasted coffee removed for distribution or use and the car then returned to place beneath the machine.

The case 1 is by preference covered with asbestos or other non-conducting material to prevent undue radiation of heat. In opposite ends of the interior of the case 1 are fixed bearings 6 and 7, respectively, in which are mounted to rotate pairs of friction wheels or rolls 8 and 9, respectively, on which are supported rotatably in a well-known manner hollow trunnions 10 and 11, respectively, fixed on the respective ends of the roasting-drum 2, which can thus be revolved with the least possible friction. The hollow trunnions 10 and 11 are by preference formed integrally with hubs 12 and 13, respectively, to which are rigidly attached the preferably-conical and sheet-metal heads of the drum 2, which is tapered longitudinally and the peripheral wall of which is perforated throughout, as indicated, so that the heat which is produced by the combustion in the drum, as hereinafter described, will be more approximately equalized throughout the drum, and the products of combustion will escape through the perforations into the outer case 1. Further along the interior of the perforated wall of the drum 2 are secured at equal intervals inwardly and radially projecting blades 17 at an equal and like inclination to the corresponding elements of the wall of the drum. These blades 17 are preferably six in number and extend from head to head of the drum, as shown, and the arrangement is such that the coffee to be roasted being introduced into the drum, as hereinafter described, and the drum revolved in the direction indicated by the arrow in Figs. 1 and 3, the beans running on the bottom of the drum toward its larger end owing to the inclination of the wall of the drum will be carried upward by the blades 17 in succession and will then run down said blades toward the smaller end of the drum owing to the reverse inclination of said blades. Then as the blades approach the top of the drum the beans will fall off said blades into the bottom of the drum, nearer the smaller end thereof, to again run down the bottom toward the larger end of the drum until they are again picked up and shifted by the following blades, as before. The coffee in the drum is thus repeatedly carried backward and forward in the drum and thoroughly mixed and agitated, so that the heat is uniformly distributed throughout the entire contents of the drum and a perfectly-even roasting of the whole charge effected.

For rotating the drum during the roasting process the hollow trunnion 11 at the smaller end of the drum is extended outward through an opening 18 in the end of the case 1, and on the end of said trunnion outside the case is fixed an annular bevel-gear 19, which is engaged by a smaller bevel-gear 20 on the end of a transverse shaft 21, turning in bearings 22 and carrying a hand-wheel 23 for rotating the drum by hand in the charging and discharging operations hereinafter described. The shaft 21 carries another bevel-gear 24, which is revolved by a bevel-gear 25, fixed on a longitudinal drive-shaft 26, carrying fast and loose pulleys, by which with an ordinary belt-shifter the drum may be revolved by power and stopped at will. It is evident, however, that any other suitable driving mechanism may be used in place of that described.

For charging and discharging the roasting-drum before and after each roasting operation I employ the following appliances, although any other suitable means for the purpose may be employed in lieu thereof, if preferred.

In the peripheral wall of the drum, where one of the blades 17 is secured by its ends alone to the heads of the drum, is formed a segmental receiving and discharge opening 27, extending the full length of the drum and to the outside of which is closely fitted a swinging segmental cover 28. The cover 28 is adapted to swing peripherally over and away from the opening 27, it being fixed at its opposite ends to the arms 29 and 30 of spider-frames 31 and 32, which are mounted to rotate through a limited arc in annular bearings formed on the respective hubs 12 and 13 of the drum. Stops 36 limit the travel of the cover 28 in closing or uncovering the opening 27. The opening 27 is adapted to register alternately with the mouth of a charging-chute 37 near the top of the case, leading from the outside downward into the case, and with the bottom discharge-opening 4 of the case, before referred to.

When the cover 28 is closed, it is secured in such position by a locking device on each end, as which I prefer to employ a bolt 38, (shown in detail in Figs. 4, 5, and 6,) having its shank 39 bent parallel with itself and riding in a guide 40, fixed on an end extension of the cover 28 and held normally in locking position by a coiled spring 42. The bolt proper shoots in a socket 43 in the flange of an angle-iron secured along the periphery of the smaller head of the drum and through said socket into a corresponding socket in the aforesaid extension of the cover.

For unlocking and opening the cover 28 from outside the machine I prefer to form the shank 39 of each bolt 38 with a head 45 in position to be engaged and pressed radially inward, so as to withdraw the bolt by a bent finger-catch 46 on each arm 47 of a longitudinal rock-shaft 48, which is mounted adjacent to the discharge-opening 4 of the case in bearings on the ends of the case 1 and extends outward through one end, where it is provided with an arm 49. The arm 49 is connected by a rod 50 with a treadle 51 and is provided with a spring 52, acting in opposition to the treadle. In advance of the bolt-head 45 (as the drum is turned) and in the path of the finger-catches 46 is a curved or inclined lug 58, leading upward to the level of the head of the bolt, and immediately beyond the bolt-head in the path of the finger-catch 46 is another lug 53. Near the charging-chute 37 are also finger-catches 54, like the finger-catches 46, to engage the bolt-heads 45, said finger-catches 54 being also operated from without the case by a rock-shaft 55 and spring-actuated arm 56, having a handle-rod 57. The upper finger-catches 54 and connections serve for opening and closing the cover in charging the drum with coffee to be roasted, as follows: The power driving mechanism being disconnected, the handle-rod 57 is pulled down to throw the finger-catches into the paths of the bolt-heads 45, and the drum is then slowly revolved, as indicated by the arrows in the drawings, by the hand-wheel 23 until the finger-catches 54 strike and ride up the inclined lugs 58, engage, press inward, and unlock the bolts 38, catch and stop the lugs 53, and thus, as the drum continues to revolve, open the cover 28 to its fullest extent, where it is automatically locked by the bolts 38 engaging bolt-sockets 43½. The forward rotation of the drum is then stopped and a charge of coffee of the proper amount introduced into the drum through the chute 37 and the drum-opening which then registers therewith. The drum is then turned backward, the finger-catches unlocking the bolts and engaging and stopping the curved lugs 58 until the cover 28 is again locked automatically by the bolts, which are then freed of the finger-catches 54 by the handle-rod 57. The power driving mechanism is then thrown into gear, the drum revolved mechanically, and the heat applied until the coffee is thoroughly roasted and cleaned, as hereinafter described. After the coffee is roasted and cleaned, the power is thrown off, the treadle 51 depressed to throw the lower finger-catches 46 into the path of the bolt-heads 45, and the drum then revolved by hand until the cover is unlocked and opened, as before, when the roasted coffee will fall from the drum into the discharge-car 5, before referred to. The drum is then turned by hand for charging again, as before, for the next roasting operation.

For applying heat to the charge of coffee in the drum 2 I employ the following means; but any other means suited to the purpose may be used in place thereof.

The end of the hollow trunnion 10 on the larger end of the drum is fitted to revolve snugly within a short air-tube 60, which is fixed in the center of the corresponding head of the case 1 and opens exteriorly thereof to admit air to the burner-tubes 61, and thus support combustion. The opening in the outer end of the air-tube 60 is regulated by a rotatable plate 62, having holes of varying sizes to register singly with the end of the air-tube, and thus increase or diminish at will the supply of air to the burner. The burner-tubes 61 are here shown four in number, opening into the drum within the inner end of the hollow trunnion 10, which is covered by gauze 64, so that gas being supplied to the burner-tubes 61 and ignited inside the gauze will burn with a hot flame within the gauze, perfect combustion being obtained owing to the ample supply of air to the jet through the air-tube 60. To increase this supply of air, I prefer to fix inclined wings 65 in the hollow trunnion 10 around the gas-tubes 61, which wings as the drum and trunnion revolve accelerate the movement of the air through the air-tube 60 to the jet, and thus intensify the heat and improve the combustion. The heat thus produced in the drum is evenly distributed throughout the tumbling coffee therein, the waste products of combustion escaping through the perforated wall of the drum into the outer case 1 and thence through the top exhaust-pipe 66 into the atmosphere.

The burner-tubes 61 are supplied with gas by, in this instance, four corresponding supply-pipes 67, leading from a source of supply, which pipes are provided with suitable and independent admission-cocks 68 and are led into the upper part of the case 1, above the drum 2, through one end of the case, where the pipes are returned upon themselves to form each a superheating-coil 69 in the path of the heated products of combustion arising from the drum, so that the gas is highly heated thereby before ignition in the drum, and great economy and heating effectiveness are thus attained.

The upper part of the case 1 is by preference divided into upper and lower longitudinal compartments by a horizontal baffle-plate 70, above which one pair of coils 69 is fixed and below which the other pair of coils is located, so that the products of combustion arising from the drum first act on the lower pair of coils and are then compelled to pass through an opening 71 in the baffle-plate at the end opposite the exhaust-pipe 66 before acting on the upper coils, thus being compelled to heat all the coils throughout their length before escaping.

For inspecting the coffee during the roasting operation without stopping the machine I employ the following device, although any other suitable device may be employed in lie thereof, if preferred.

Within the smaller end of the drum 2 is fixed radially along the head a hopper or chute 72, opening toward the periphery of the drum and leading as a chute into the smaller end of a conical box 74, fixed axially within the tapering hollow trunnion 11. The entrance of the chute 72 into the box 74 may be cut off at will by a slide-gate 75, connected to a slide-rod 76, mounted to work axially in the box 74 and extending outside the trunnion and case 1 in position to be operated by the attendant.

Around the interior of the box 74, which flares toward the end of the trunnion, is formed a shallow spiral conveyer-groove 77, and the outer end of the box 74 is closed by a partition 78, through which at one side is a small opening 79, which leads into an annular trough or pocket 80, accessible and viewable through the open end of the trunnion 11. In the bottom of the trough or pocket 80 at a point peripherally distant from the opening 79 is an opening 81, leading back into the hollow trunnion and thence into the drum.

The inspecting and viewing device is used as follows: As the drum revolves, the hopper 72 picks up at each revolution a small quantity or sample of the coffee under treatment in the drum. The gate 75 is opened to admit a portion of the coffee into the box 74, wherein owing to the flare of the box and the action of the spiral conveyer-groove 77 as the drum revolves the beans travel to the larger end of the box 74, where they escape through the opening 79, as the same comes to its lowermost position, into the annular pocket 80. The beans remain in the pocket 80 and may be inspected and sampled at will until the drum has made a half-revolution farther, when the reëntry-opening 81 coming in turn to the bottom of the pocket the beans fall therethrough into the interior of the trunnion and owing to the reverse flare thereof run backward into the interior of the drum. Thus the coffee is presented for inspection and sampling from outside the machine without itself leaving the drum, of which the trunnion for this purpose forms a part, and the coffee is then automatically returned into the roasting-chamber of the drum. The attendant is thus enabled to determine with great ease how far the roasting has progressed and when to stop the machine, discharge the roasted coffee therefrom, and introduce therein a fresh charge.

The number of separate gas-pipes and burners and the variable air-supply devices enable the heat to be regulated to a nicety, as either one or more of the burners may be used at will.

In the center of the group of burner-tubes 61 I by preference introduce from outside the case 1 through the side of the air-tube 60 a water-pipe 82, having a supply-controlling valve 83, the mouth of the pipe opening at the inner end of the hollow trunnion 10 and serving for admitting a stream of water into the drum after each roasting operation to conveniently and thoroughly clean and cool the roasted coffee before removing it from the drum.

I claim as my invention—

1. In a coffee-roasting machine, the combination of an outer case having an exhaust-pipe, a perforated roasting-drum mounted rotatably in the case and having a hollow trunnion, a baffle-plate in the case between the drum and the exhaust-pipe, and gas-pipes led into the case, formed into superheating-coils on opposite sides of the baffle-plate, and thence led into the drum as burner-tubes through the hollow trunnion.

2. In a coffee-roasting machine, a rotatable roasting-drum, tapering uniformly from end head to end head and having a series of blades fixed along its sides, each extending from end head to end head of the drum, and each inclined with respect to the axis of the drum in a direction contrary to the slope of the bottom of the drum as and for the purpose herein described.

3. In a coffee-roasting machine, the combination of a case having an air-tube leading inward from one end, a roasting-drum mounted rotatably therein and having a hollow trunnion jointed rotatably to said air-tube, a gas-pipe leading through said trunnion as a burner-tube into the drum, and a rotatable plate journaled at one side of the air-tube and formed with a concentric graded series of air-openings adapted to register singly with the outer open end of the air-tube for varying the size of the exterior opening of said air-tube and thus regulating the supply of air to the burner.

4. In a coffee-roasting machine, the combination with the roasting-drum having a segmental opening and end hubs carrying trunnions, of a segmental cover movable peripherally over said drum-opening, and arms carrying the ends of said cover mounted to swing peripherally on said hubs.

5. In a coffee-roasting machine, the combination of a case, a roasting-drum mounted rotatably in said case, and having an opening, a cover on the drum movable over said opening, a bolt to lock the cover to the drum, a finger to work said bolt and means for operating said finger.

6. In a coffee-roasting machine, the combination of a case, a roasting-drum mounted rotatably in said case and having an opening, a cover on the drum movable over said opening, a bolt to lock the cover to the drum, a lug on the cover adjacent to the bolt, a finger-catch to work said bolt, engage said lug and operate the cover, and means for operating said finger-catch.

7. The rotatable roasting-drum, having the hollow trunnion 11, whose bore flares toward the drum, the annular internal pocket or trough 80 fixed within the smaller open end of the trunnion and having an opening 81 leading into the flaring bore of the trunnion, the chamber or box 74 fixed within the trunnion, flaring toward the end thereof, and having an opening 79 in its outer end communicating with the trough 80 angularly apart from the opening 81, and a conveyer leading from the inside of the drum into the chamber 74.

In testimony whereof I have hereunto set my hand this 2d day of December, 1898.

JASPER ALAN McCASKELL.

In presence of—
CLARENCE L. BURGER,
DAVID G. ROWE.